United States Patent
Weston et al.

(10) Patent No.: US 6,233,022 B1
(45) Date of Patent: May 15, 2001

(54) VIDEO SIGNAL ENHANCEMENT THROUGH NON-LINEAR COMBINATION OF LEFT AND RIGHT DIFFERENT SIGNALS

(75) Inventors: Martin Weston; Avigdor Steinberg, both of Petersfield (GB)

(73) Assignee: Snell & Wilcox Limited (GB)

( * ) Notice: Subject to any disclaimer, the term of this patent is extended or adjusted under 35 U.S.C. 154(b) by 0 days.

(21) Appl. No.: 09/049,824

(22) Filed: Mar. 27, 1998

(30) Foreign Application Priority Data

Sep. 28, 1995 (GB) .................................. 9519767
Sep. 27, 1996 (WO) .................... PCT/GB96/02402

(51) Int. Cl.[7] ............................................. H04N 5/21
(52) U.S. Cl. ................................. 348/625; 348/627
(58) Field of Search ................................ 348/625, 607, 348/622, 618, 627; 382/254, 260, 266, 269

(56) References Cited

U.S. PATENT DOCUMENTS

| | | | |
|---|---|---|---|
| 5,023,919 | * 6/1991 | Wataya | 382/54 |
| 5,404,180 | 4/1995 | Kitano | 348/625 |
| 5,479,216 | * 12/1995 | Reime | 348/631 |
| 5,521,649 | * 5/1996 | Reime | 348/625 |
| 5,696,852 | * 12/1997 | Minoura et al. | 382/266 |

FOREIGN PATENT DOCUMENTS

| | | |
|---|---|---|
| 0505999 A2 | 9/1992 | (EP) . |
| 2222267 | 9/1990 | (JP) . |

* cited by examiner

Primary Examiner—Victor R. Kostak
(74) Attorney, Agent, or Firm—Townsend and Townsend and Crew LLP; Kenneth R. Allen

(57) ABSTRACT

A video signal is enhanced using a non-linear combination of left and right difference signals (L and R), constrained to be zero if either L or R is zero, using a minimum absolute value function. Edge enhancement is provided when the polarities of L and R are the same and peak enhancement when the polarities are different. Difference signals are derived with delays (2 and 4) and a subtracter (3). The non-liner combinations are derived in a lookup table (30).

9 Claims, 4 Drawing Sheets a) INPUT SIGNAL
b) LEFT AND RIGHT DIFFERENCES
c) EDGE CORRECTION SIGNAL
d) PEAKING CORRECTION SIGNAL
e) ENHANCED SIGNAL a) INPUT SIGNAL
b) LEFT AND RIGHT DIFFERENCES
c) EDGE CORRECTION SIGNAL
d) PEAKING CORRECTION SIGNAL
e) ENHANCED SIGNAL

VIDEO SIGNAL ENHANCEMENT THROUGH NON-LINEAR COMBINATION OF LEFT AND RIGHT DIFFERENT SIGNALS

BACKGROUND OF THE INVENTION

This invention relates to the processing of analogue and digital video signals and is particularly concerned with restoration of picture sharpness, ie. with recovery of wanted high frequency signal components lost or reduced in the process of video recording or transmission. Traditionally, such processing is known as aperture correction or edge enhancement.

A well known enhancement technique is to determine the second differential of the signal, multiply it by a coefficient (which determines the degree of correction) and add the result to the input signal. The frequency response of such an enhancer is linked to its pulse response by the well-known Fourier transform. A fundamental limitation of this kind of enhancer is that it is impossible to boost the high frequency components without visible and annoying overshoots in the pulse and step responses.

There is another known, non-linear edge enhancement technique based on the synthesis of high frequency components by extension of the low-frequency part of the signal spectrum. This approach includes the calculation of the first and second derivatives of an input signal, then multiplication of said first derivative by the clipped second derivative and, finally, summation of the resulting correction signal with the incoming signal. Such processing provides improved pulse response, although the pulse response is not completely free from unwanted overshoots or ripples, and periodic picture textures are degraded.

BRIEF SUMMARY OF THE INVENTION

The object of this invention is to provide an edge enhancer which offers improvement in the sharpness of picture edges. A further object is to provide a peak enhancer, which offers improvement in the contrast of lines and high-frequency textures without visible artefacts. It is a further object of this invention to provide an improved enhancer capable of combining both signal steepness correction and "peaking" on sinusoidal textures and the tops of short pulses.

Accordingly, the present invention consists in a method of video signal processing comprising the steps of forming left and right difference signals and deriving an enhancement signal through non-linear combination of said difference signals, wherein the enhancement signal is constrained to be zero if either the left or the right difference signal is zero.

The separate use of left and right difference signals gives superior and more flexible correction than prior-art enhancers.

Advantageously, the enhancement signal comprises an edge enhancement signal when the polarities of the left and right difference signals are the same and a peak enhancement signal when the polarities of the left and right difference signals are different.

It is a still further object of this invention to provide an improved enhancer in the form of a circuit which calculates the best of the output correction signals from several constituent enhancers differing in the size of their "correction windows", ie. the delay between the signal samples involved in the left/right difference calculations.

Preferably, the method further comprises the step of deriving a plurality of enhancement signals with respect to different time intervals $T_1$ to $T_N$ and selecting one enhancement signal for use.

Both analogue and digital implementations are possible. Particularly in the case of analogue implementation, the processing can be done in many ways with equivalent results; the variants shown below must be regarded only as examples.

This invention will now be described by way of example with reference to the accompanying drawings in which:

DETAILED DESCRIPTION OF THE INVENTION

Figure 1:
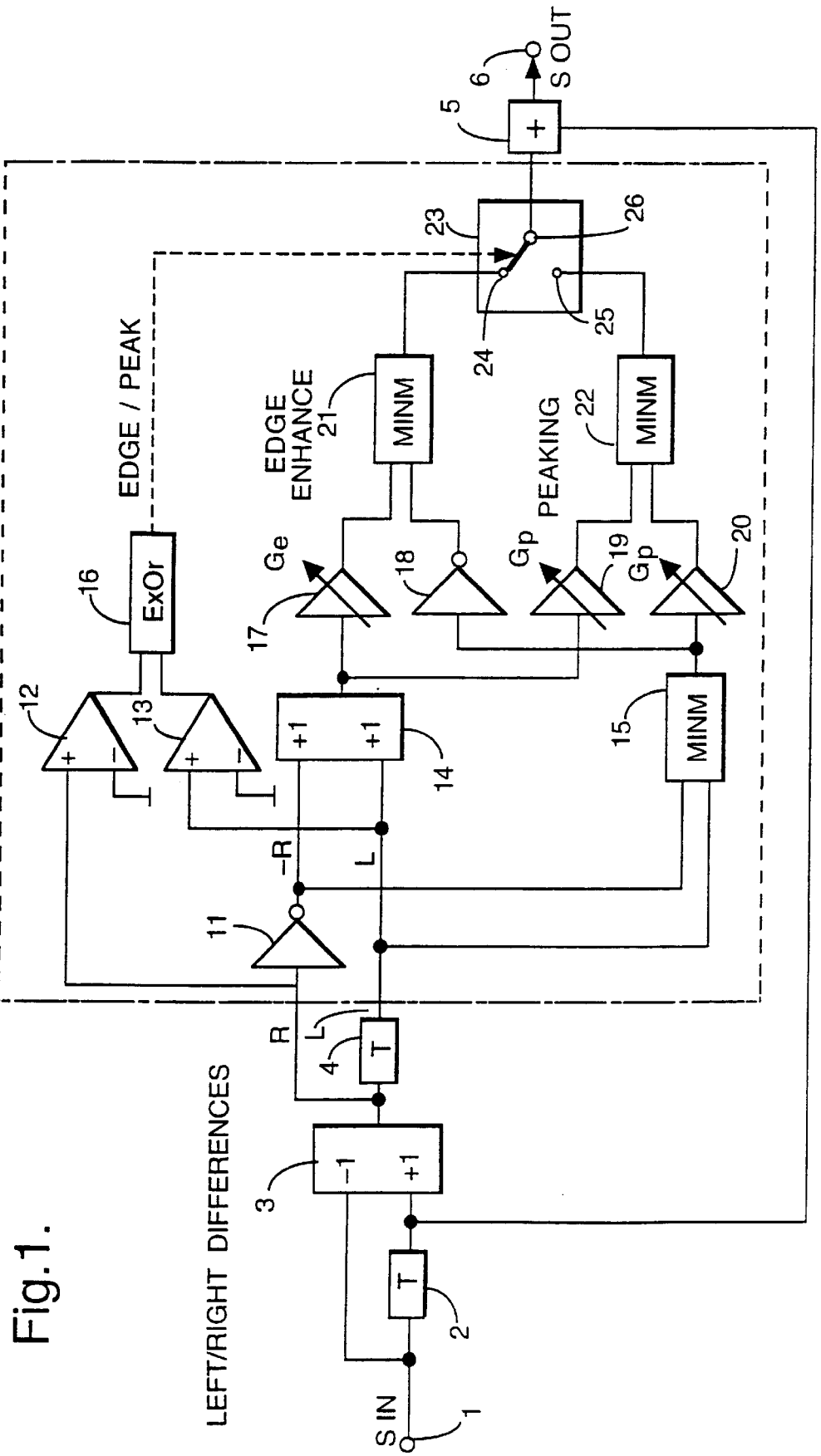
FIG. 1 is a general block diagram of an edge and peak enhancer according to the present invention.

Referring initially to FIG. 1, a signal $S_{in}$ at an input terminal 1 passes through a delay line 2 and an adder 5 to an output terminal 6. The output of the delay line 2 is also taken to the non-inverting input of a subtracter 3 which receives the signal $S_{in}$ at its inverting input. In this way, the current slope of this signal is evaluated by the subtracter 3. The right difference signal R from the output of the subtracter 3 is fed to the input of a second delay line 4, providing at its output the left difference signal L. The right difference signal R is also taken to an inverter 11 providing at its output the inverted right difference signal −R. The right and left difference signals are compared with zero in respective comparators 12 and 13, for a purpose to be described. They are also fed to the inputs of an adder 14, providing a second derivative signal (L−R), and fed to the inputs of a minimum magnitude detector 15.

The minimum magnitude detector provides the function Minm(A,B) where:

Minm(A,B)=if abs(A)<abs(B) then A else B

Figure 2:
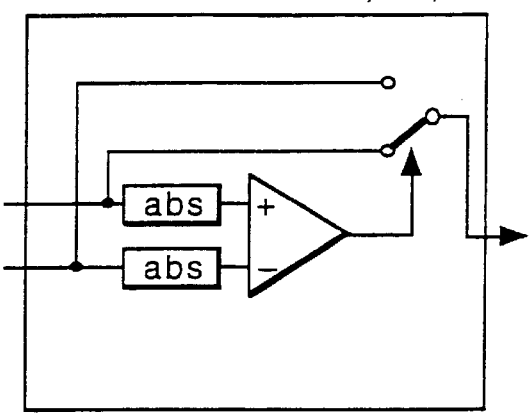
FIG. 2 is a detailed view of a component used a number of times in the enhancer shown in FIG. 1.

FIG. 2 shows one example of a possible implementation of a minimum magnitude detector. It works as follows: a comparator, which is fed by the absolute values of the input signals, controls a switch selection in such a way that the signal with smaller magnitude is selected for further processing.

Returning to FIG. 1, the signals from the outputs of the adder 14 and minimum magnitude detector 15 are fed, respectively, through gain control amplifier 17 and inverter 18 to a further minimum magnitude detector 21 to provide an edge correction signal at the terminal 24 of switch 23.

This edge correction signal $C_{edge}$ takes the form:

$$C_{edge}=Minm\,(G_e{}^* \,(L-R),\,-Minm(L,-R))$$

In a similar way the outputs of the adder 14 and minimum magnitude detector 15 are fed, respectively, through gain control amplifiers 19 and 20 to minimum magnitude detector 22 to provide a peaking enhancement signal at the terminal 25 of switch 23. This signal $C_{peak}$ takes the form:

$$C_{peak} = \text{Minm}(0.5^* G_p(L-R), G_p^* \text{Minm}(L,-R))$$

The comparison of the polarities of the L and R signals in the exclusive-or gate 16 provides the control signal for the switch 23 which determines whether "edge" or "peak" correction should be applied. If the polarities are the same, edge correction is applied, if the polarities are different, peak correction.

The degree of "edge" enhancement is set by the gain of the amplifier 17 (indicated as the parameter $G_e$ in the figure).

The gain of amplifier 19 is required to be half that of amplifier 20. The degree of "peak" enhancement is set by these gains (indicated by the parameter $G_p$ in the figure).

The complete edge and peak correction signal at the output terminal of switch 26 is added to the input signal in the adder 5 to form the enhanced output signal $S_{out}$ at the terminal 6.

The correction signal is always a result of a minimum difference selection and so the level of an enhanced transient never exceeds the adjacent flat-area level, which means that overshoots can never occur. Put another way, the enhancement or correction signal is constrained to be zero if either the left or the right difference signal is zero.

Although FIG. 1 shows a switch to select between the edge and peak correction signals no discontinuities in the correction signal are introduced when the switch changes state. This is because the comparators feeding the exclusive-or gate only change state at zero crossing of L or R. When L is at zero both inputs to the switch are equal (at a voltage of −R) and when R is at zero both switch inputs are zero.

Figure 3:
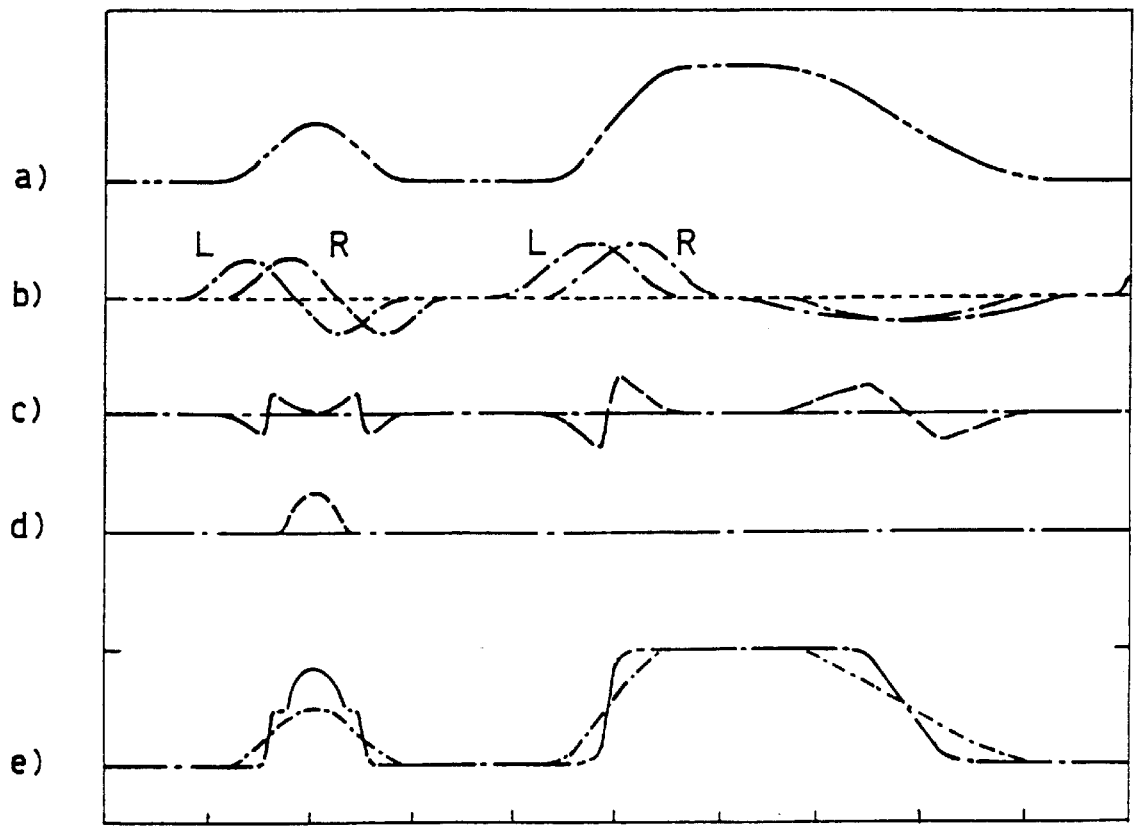
FIG. 3 is a family of plots illustrating step and pulse responses at important points within the enhancer shown in FIG. 1.

FIG. 3 shows the shapes of the waveforms at some important points in FIG. 1.

FIG. 3*a* shows an input signal consisting of a wide pulse and sine-squared pulse with a rise-time approximately equal to the delay T in the delay lines 2 and 4 on FIG. 1.

In FIG. 3*b* the left and right difference (derivative) signals are shown.

In FIG. 3*c* the edge correction signal is shown. Note that when both difference signals are equal the polarity of the correction signal changes. Immediately before and after the polarity change (when the left and right differences are approximately equal) the signal is controlled by the change of slope of the input signal ie. the signal selected by minimum magnitude selector is the second derivative multiplied by the control parameter $G_e$.

In FIG. 3*d* the peaking correction signal is shown. This signal exists only where the polarities of left and right differences are different and reaches its maximum at the top of the pulse.

In FIG. 3*e* the output enhanced signal is shown. Note that when one of the difference signals changes polarity the correction changes between the edge and peak enhancement modes. The important advantage of the enhancer according to the present invention is that the correction signal is cancelled at flat areas, in particular at the baseline of the waveform before and after pulses. Hence there are no unwanted ripples or overshoots.

Figure 4:
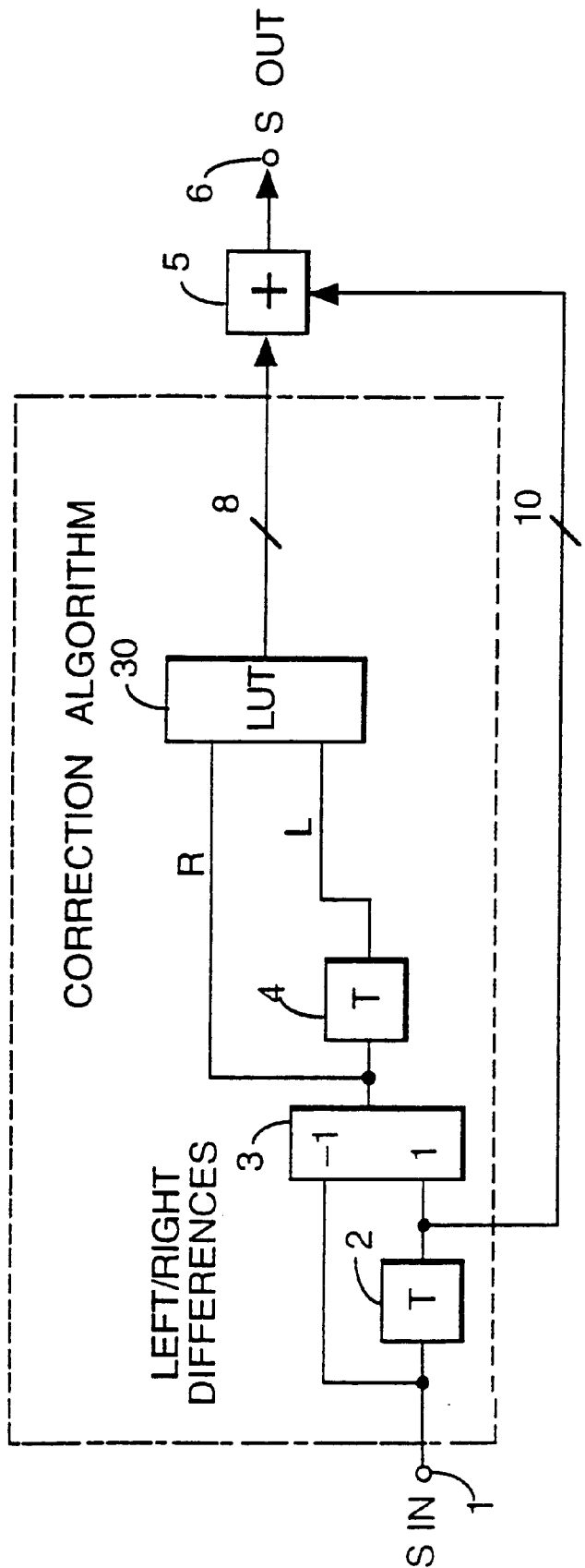
FIG. 4 is a diagram showing one variant of a digital implementation of the components shown in block form in FIG. 1.

FIG. 4 shows a digital implementation of the enhancer. The input signal passes through the blocks 2, 3, 4 and 5, identical to these shown in FIG. 1, to the output 6. The two differences signals, L and R, are fed to the inputs of the look-up table 30. This combines the functions of all the blocks within the dotted line rectangle shown in FIG. 1. Because the output of the look-up table is a correction signal, rather than the main path signal, it can be quantised with less levels than the main path, for instance, with 8 bits instead of 10. Obviously, the use of a look-up table for all the non-linear operations makes the digital implementation quite economical and compact.

Figure 5:
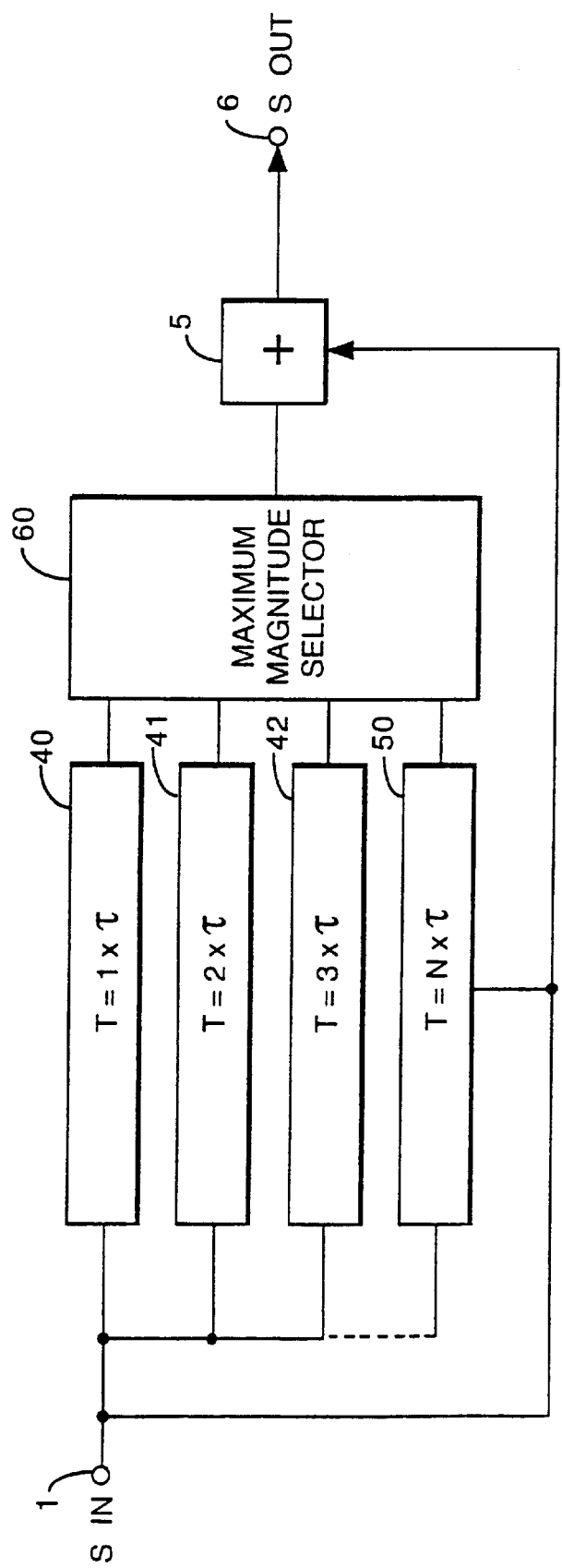
FIG. 5 is a diagram showing the "multiple windows" variant of the enhancer shown in block form in FIGS. 1 and 3.

FIG. 5 shows an improved enhancer in which the input signal $S_{in}$ is fed to several primary enhancers 40, 41 . . . 50, differing only in the size of correction window T, ie. the delay between signal samples involved in the left/right differences calculation. The outputs of these primary enhancers are combined in a maximum magnitude selector 60 so that the highest level correction signal is always selected, and the enhancer automatically adapts itself to the bandwidth (sharpness) of incoming signal. The implementation of the maximum magnitude selector is similar to the minimum magnitude selector shown in FIG. 2.

With digital hardware it is possible to do more than one set of calculations in one sampling interval and so the parallel processing shown may in fact be provided merely by an increase of the system clock rate above the sampling rate and using the part of the hardware several times over.

What is claimed is:

1. A method of video signal processing comprising the steps of forming left and right difference signals L and R, and deriving an enhancement signal through non-linear combination of said difference signals, wherein the enhancement signal is constrained to be zero whenever L is zero and wherein the enhancement signal is constrained to be zero whenever R is zero.

2. A method according to claim 1, wherein the enhancement signal is constrained to be zero if either the left or the right difference signal is zero, through operation of a function which selects of its arguments that having the minimum absolute value.

3. A method of video signal processing comprising the steps of forming left and right difference signals L and R, and deriving an enhancement signal through non-linear combination of said difference signals, wherein the enhancement signal is constrained to be zero if either L or R is zero, wherein the enhancement signal comprises an edge enhancement signal when the polarities of the left and right difference signals are the same and a peak enhancement signal when the polarities of the left and right difference signals are different.

4. A method of video signal processing comprising the steps of forming left and right difference signals L and R, and deriving an enhancement signal through non-linear combination of said difference signals, wherein the enhancement signal is constrained to be zero if either L or R is zero, wherein the enhancement signal comprises an edge enhancement signal $C_{edge}$, where $$C_{edge} = \text{Minm}(G_e^* (L-R), -\text{Minm}(L,-R))$$

and where the function Minm is defined by $$\text{Minm}(A, B) = \text{if abs}(A) < \text{abs}(B) \text{ then A else B}.$$

5. A method of video signal processing comprising the steps of forming left and right difference signals L and R, and deriving an enhancement signal through non-linear combination of said difference signals, wherein the enhancement signal is constrained to be zero if either L or R is zero, wherein the enhancement signal comprises a peak enhancement signal $C_{peak}$, where $$C_{peak} = \text{Minm}(0.5^* G_p(L-R), G_p^* \text{Minm}(L,-R))$$

and where the function Minm is defined by $$\text{Minm}(A, B) = \text{if abs}(A) < \text{abs}(B) \text{ then A else B}.$$

6. A method according to claim 1, wherein one difference signal is calculated by subtracting a signal delayed by time interval T and the other difference signal is derived through delaying said one difference signal by time interval T.

7. A method of video signal processing comprising the steps of forming left and right difference signals L and R, and deriving an enhancement signal through non-linear combination of said difference signals, wherein the enhancement signal is constrained to be zero if either L or R is zero, and wherein one difference signal is calculated by subtracting a signal delayed by time interval T, and the other difference signal is derived through delaying said one difference signal by time interval T, comprising the step of deriving a plurality of enhancement signals with respect to different time intervals $T_1$ to $T_N$ and selecting one enhancement signal for use.

8. A method according to claim 7, wherein the enhancement signal having the largest magnitude is selected for use.

9. A method of video signal processing, comprising the steps of:
forming a difference signal R by subtraction between a video signal and the video signal delayed by a time interval;
forming a delayed difference signal L by delaying the difference signal R by a time interval;
deriving an enhancement signal through non-linear combination of said difference signals L and R, wherein the enhancement signal is constrained to be zero whenever L is zero and wherein the enhancement signal is constrained to be zero whenever R is zero; and
linearly combining said enhancement signal with said video signal.

* * * * *